March 13, 1962    D. J. KRUMM ET AL    3,025,315
METHOD OF PROCESSING ANIMAL FATS
Filed May 27, 1959
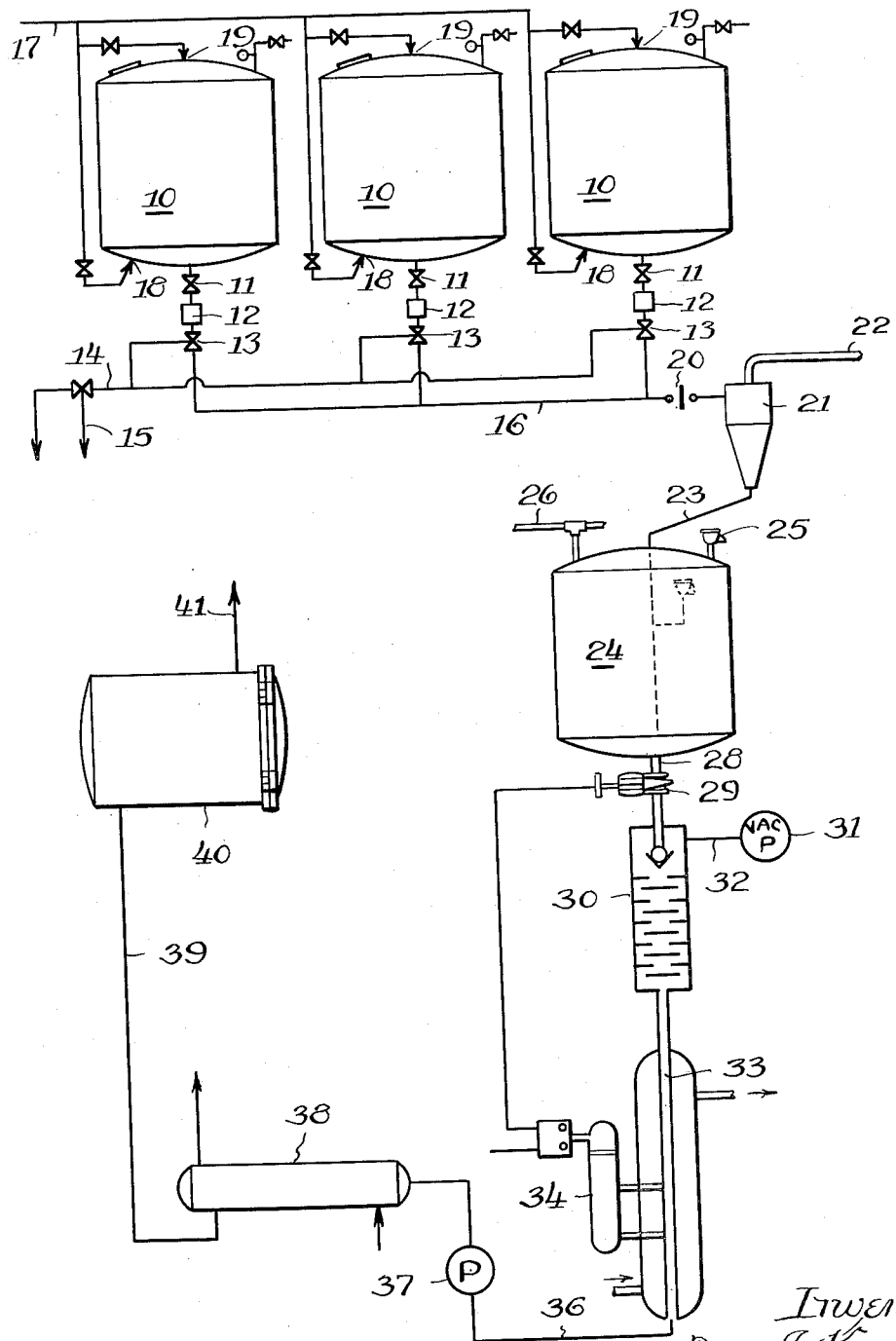
Inventors,
Dero J. Krumm
Rodney A. Stewart,
By: Schneider, Dressler, Goldsmith & Clement
Attys.

United States Patent Office 3,025,315
Patented Mar. 13, 1962

3,025,315
METHOD OF PROCESSING ANIMAL FATS
Dero J. Krumm, Elmhurst, and Rodney A. Stewart, Park Forest, Ill., assignors to Wilson & Co., Inc., a corporation of Delaware
Filed May 27, 1959, Ser. No. 816,312
6 Claims. (Cl. 260—412.6)

This invention relates to the processing of animal fats. More particularly, it relates to the rendering of animal fats to produce rendered stocks of improved essential properties. Still more particularly, it relates to a simplified process for the preparation of prime steam lard meeting commercial specification for refined lard.

Lard is a rendered fat preferably of pure white color and a salve-like consistency. Prime steam lard is the product obtained by steam rendering the fat of hogs, which is not utilized for special purposes. For example, the fat which surrounds the kidneys and viscera of a pig are utilized for making leaf lard. However, this fat on occasion may be mixed with other fats for the preparation of prime steam lard, etc. Regardless of the sourceof fat, i.e., pig, steer, beef, horse, mutton, etc., fats rendered in accordance with the hereinafter described process have improved characteristics over those of the conventional corresponding rendered fats.

In the preparation of prime steam lard, fat in chunk style or as comminuted fat is introduced into a batch kettle or tank. Steam generally at a pressure of between 45 lbs. per square inch and 75 lbs. per square inch absolute, is forced through the mass from the bottom to render the fat and agitate the resultant liquid mixture. Substantially complete rendering requires between 1½ and 3 hours. When the fat has become liquefied, steam entering the tank from the bottom is shut off. In order to maintain the temperature of the liquids and pressure on the system, necessary for accelerated phase separation, steam at a suitable temperature and pressure is introduced into the free space at the top of the tank to blanket the tank contents with hot steam while avoiding agitation of the liquid.

After standing in a non-agitated condition for about ½ hour, if the accelerated settling system is used, or 3 to 4 hours if conventional atmospheric tank settling is used, the material in the tank separates into three distinct phases. A straw yellow liquid fat phase floats on the top. An intermediate or cracklings phase consisting of solid proteinaceous residues and some fat forms in the intermediate zone. The bottom phase is an amber colored water known as stick water which may be processed to recover water soluble proteinaceous mateiral, if desired. After settling, if the tank is at atmospheric pressure, the various phases may be drawn off to their irrespective storage and/or processing tanks. If the tank is under pressure the various phases of the settled tank contents may be withdrawn individually using the so called "high pressure draw off system" wherein the system pressure is not reduced until the individual phases are separated.

Under the conventional steam rendering systems, the hot liquid fat is decanted at atmospheric pressure to open tanks equipped with heating coils for settling. After 4 to 12 hours, the water and solid proteinaceous matter is separated by withdrawing one or the other of the phases. Under the conventional "high pressure drawoff" process, the hot liquid fat is withdrawn to open tanks equipped with heating coils, which maintain the liquid fat at a temperature above the boiling point of water in order to reduce the moisture content of the fat to about 0.2%.

This type processing has numerous disadvantages processwise and the product must be subjected to one or more processing steps to alleviate or correct developed characteristics such as color so that the product will meet commercial specifications for prime steam lard. The process is time consuming because it requires the holding of liquid fat at elevated temperatures for long periods. In addition, the high temperature, particularly when the fat is in contact with air, increases the fatty acid content, develops undesirable odor and flavor, darkens the color of the fat and accelerates development of rancidity.

In order to provide prime steam lard meeting commercial specification, for refined lard, the liquid fat must be subjected to filtration using such filter mediums as diatomaceous earth, fuller's earth, etc., either premixed with the fat or precoated on the filter. If the contact with, for example, fuller's earth effects sufficient bleaching and removes sufficient color bodies and impurities, the product may meet specifications for refined lard, otherwise, it is rated as simply prime steam lard.

When operating in accordance with the new process, as hereinafter described, time required for processing is markedly reduced and such operations as combined filter-bleaching steps are eliminated.

Briefly, the new process involves, rendering fat by direct contact with steam under pressure, settling the tank contents, removing the liquid fat phase and subjecting the hot fat, when at a temperature above about 230° F. to sub-atmospheric pressure in excess of about 24 inches of Hg whereby the heat in the liquid is utilized to vaporize and remove all but traces of the water present, cooling the flashed liquid fat to effect liquidation of some proteins soluble in hot fat, removing the solidified proteins and insoluble impurities carrying through from the rendering step by a simple filtration operation and cooling the processed fat to provide a congealed stable prime steam lard.

The process for rendering animal fats will be described in detail with reference to the manufacture of prime steam lard because the processing of this product exemplifies the operations irrespective of the particular fat being processed. The first step in the preparation of prime steam lard is to fill a treating tank with pieces of hog fat. These treating tanks usually are batch tanks with one or more tanks operated, for example, so that while one batch of fat is being rendered, another tank is being readied for processing by filling with fat and a third tank is being emptied of products of the steam rendering steps. The treatment tanks are closable tanks within which the tank contents can be held under positive pressure. When filled with fat, steam is introduced at the bottom of the tank. This steam passes directly into the fat at a pressure in the range of between about 45 lbs. per square inch and 75 lbs. per quare inch absolute, preferably at a pressure of about 55 lbs. to 65 lbs. per square inch absolute. Steam at these pressures will heat the tank contents to a temperature between about 290° F. and about 320° F. Temperatures below 290° F. can be used by considerably lengthening the time for rendering. Temperatures above 320° F. can be used but necessitate careful control to avoid scorching and discoloration. When operating with steam at 60 lbs. per square inch absolute pressure and at a temperature of about 307° F. the time required to render 4000 lbs. of pork fat is between 1½ and 3 hours, generally with the time of processing averaging about 2 hours.

After rendering the fat, introduction of steam is altered. Steam at 60 lbs. per square inch absolute is switched so as to be introduced into the head space at the top of the tank. This steam maintains the temperature of the liquid at about 300° F. without agitating the tank contents. Maintenance of pressure on the system prevents superheated settled water from vaporizing, which evolution of steam bubbles would adversely affect settling through agitation of the tank contents. In about 20 minutes to 45 minutes, usually of the order of 30 minutes, the tank contents from the rendering of 4000 lbs. of fat making a substantially complete separation into three phases. Utilizing a bottom draw off and maintaining the 60 lbs. per square inch absolute pressure on the system, the water phase is drawn off in about 5 to 7 minutes. Processing of the water to recover salable products, form no part of the instant invention. The second or cracklings phase is withdrawn to a separate storage or processing tank in about ½ to 1½ minutes.

The rendering tank is next emptied of liquid fat. This liquid fat phase has a volume such as to require about 20 to 30 minutes for withdrawal. Liquid fat at this stage is at a temperature, assuming contact with 60 lbs. per square inch absolute steam, of approximately 290° F. and has a water content of between about 0.5 and about 1.0% by weight.

Hot liquid fat is fed to a pressure release apparatus of suitable design, which may be a conventional vented cyclone, or one having internal construction designed to maintain the liquid in thin film form. If the balance of the processing equipment is properly sized, the liquid fat can be processed from this point on a continuous basis. Reduction of the pressure on the hot fat from 60 lbs. per square inch absolute to atmospheric pressure, i.e., 15 lbs. per square inch absolute is accompanied by an evolution of steam which vaporization has a cooling effect on the liquid fat. Temperature, pressure drop and water content of the liquid fat determine the temperature drop at this stage of the operation. Fat of approximately 1% water content at a temperature of about 290° F. and under 60 lbs. per square inch absolute pressure will cool to between 230° F. and 250° F., depending upon radiation heat losses. Liquid fat at higher or lower temperature and higher or lower pressure will show cooling of an appreciable degree but not necessarily correlatable based upon any one factor.

Liquid fat from the pressure release apparatus is accumulated in a closed surge tank under a blanket of vaporized steam. Liquid fat at a temperature of 230° F. to 250° F. is introduced into the surge tank through a conduit having a submerged outlet and reaching to adjacent the bottom of the surge tank. The tank is maintained at a pressure slightly below atmospheric, i.e., at a subatmospheric pressure preferably of between 2 and 5 inches of water. Generally this tank is equipped with a small steam operated ejector designed to produce a small negative pressure. Steam evolved from the hot liquid in this surge tank keeps an inert atmosphere blanketing the hot fat. Alternatively the surge tank could be maintained at a slightly super-atmospheric pressure by continuous introduction of an inert atmosphere. As a safety measure a pressure-vacuum valve is provided to prevent pressure buildup of water vapor in the form of steam or excessive vacuum.

If a sub-atmospheric pressure is maintained, a loaded release valve is utilized in a by pass line connecting liquid inlet pipe and vacuum line so as to prevent drawing of atmospheric air through the hot liquid fat in the surge tank when the tank runs low on feed for the flash evaporator. The volume of this surge tank is always maintained small compared with the flow rate volume of the system.

Feed to the high vacuum treatment zone will have a moisture content of between about 0.3% and 0.6% by weight. Reduction of the water content through less than 0.1% may be accomplished in suitable equipment where the fat is treated while in an attenuated condition such as in the form of a thin film, spray, etc., such as a thin film evaporator, a so-called flash evaporator and certain kinds of rectification apparatus such as a bubble plate tower. Preferably, the hot liquid fat is fed to a direct contact condenser of the cascade type equipped with a steam jet or mechanical vacuum pump capable of maintaining a high vacuum on the system, i.e., sub-atmospheric pressure in excess of 24 inches of mercury generally of the order of 25 to 28 inches of mercury or, expressed another way, sub-atmospheric pressures of 2–5 inches of mercury absolute.

Hot liquid fat cascaded in the form of thin films flashes off vaporized water. Water vapors will leave the apparatus at about 130° F. Liquid fat will be withdrawn from the flash drying apparatus at a temperature of between about 190° F. and 220° F.

Warm liquid fat after flashing off the water is subjected to cooling in a heat exchanger of suitable design. In this cooler the temperature of the liquid fat is reduced to between about 150° F. and about 180° F. Cooling of the liquid fat to this temperature range, causes some fat soluble proteins to solidify. Removal of these solids along with miscellaneous suspended material is accomplished in a conventional filter, using any filter medium capable of removing fine suspended solids, for example, asbestos fibers.

The invention will be more fully understood from a description of the apparatus used to process rendered fat on a continuous basis as shown in the attached figure. In the FIGURE, the numeral 10 indicates rendering tanks. Rendering tanks 10 are adapted for bottom draw off of liquid through shut off valve 11, sight glass 12 and three way valve 13. Draw off of liquids is controlled manually. Draw off of stick water and cracklings is through conduits 14 and 15, here merely indicated as being discharged. Liquid fat is discharged through conduit 16. Tanks 10 are provided with steam under suitable pressure, for example, 45 lbs. to 75 lbs. per square inch absolute through steam line 17 which communicates with a submerged tank steam inlet 18 and with an inlet 19 connecting to the top interior space of the tank. Uncondensed steam passes out of the rendering tank 10 through suitable exhaust conduit equipped with conventional safety pressure relief valves.

Conduit 16 delivers hot liquid fat through control orifice 20 to pressure release cyclone 21. Cyclone 21 is provided with an outlet 22 for venting vapors to the atmosphere. Liquid accumulated in the bottom of cyclone 21 is delivered through conduit 23 to adjacent the bottom of an air tight surge tank 24.

Surge tank 24 is provided with a pressure and vacuum relief valve 25 so that it is not possible to carry more than a few inches of water, sub-atmospheric or super-atmospheric pressure. Sub-atmospheric pressure is maintained by means of steam ejector 26. Liquid fat is withdrawn from the bottom of surge tank 24 through conduit 28 in which the flow is controlled by diaphragm motor valve 29 and delivered to a cascade type condenser 30. Liquid fat is subject to flash evaporation in condenser 30 as it flows in thin films from overflow tray to overflow tray. Cascade type condenser 30 is connected to a source of vacuum 31 such as a "Nash Hytor" pump through conduit 32.

Liquid fat flashed in cascade condenser 30 accumulates in water jacketed tail pipe 33. Tail pipe 33 is adapted with a level controller 34 which in turn controls flow into the cascade condenser 30 through actuation of diaphragm motor valve 29.

Flashed liquid fat is withdrawn from tail pipe 33 through conduit 36 by means of pump 37 and delivered to suitable heat exchanger 38. Pump 37 is preferably of the variable speed type adjusted so that the volume of fat being handled by the dryer or cascade condenser 30 will not release a vapor volume greater than the capacity of vacuum pump 31 which vacuum pump must maintain a vacuum higher than 24 inches of mercury at all times.

After passage through the heat exchanger, the fat is at a temperature of about 160° F. to 180° F. This cooled fat flows through conduit 39 to a suitable filter 40 such as a pressure leaf filter designed to remove suspended solids. From filter 40 the liquid fat is delivered to storage or filling facilities through conduit 41 where the fat ultimately cools to a congealing temperature below about 95° F.

The invention is set forth in detail by the following examples which are given by way of illustration and without any intention that the invention be limited thereto.

EXAMPLE I

Pork fat is broken up into three-quarter inch chunks. Approximately 4000 lbs. of fat is accumulated as a batch for the first of a series of tanks connected in parallel. Steam under 60 lbs. per square inch absolute pressure and at a temperature approximately 307° F. is passed through the fat for approximately 2 hours.

After 2 hours steaming, passage of steam through the fat is stopped and steam, also at 60 lbs. per square inch absolute pressure, is fed into the free space at the top of the tank. Tank contents are maintained under this steam pressure and under non-agitation conditions for approximately ½ hour during which time three distinct phases form in the tank contents. Liquid fat phase removed from this tank under pressure, when delivered to the pressure release cyclone is at approximately 290° F. Steam is evolved during the pressure release operation and the temperature of the fat drops to about 245° F. Moisture content of the fat at this stage is about 0.45%.

Liquid fat drained from the pressure release cyclone is accumulated in the surge tank holding approximately 4000 lbs. of liquid fat. Liquid is withdrawn from this surge tank at a rate of about 3500 lbs. per hour. A vacuum of approximately 2 inches of water is maintained on this tank and accumulates a blanket of steam by which means atmospheric air is excluded from the tank. The liquid fat at this stage is at a temperature of 235° F.

Material withdrawn from the surge tank cascades through the condenser maintained at a vacuum of approximately 26 inches of mercury by a "Nash Hytor" pump. Liquid fat accumulating in the tail pipe of the cascade type condenser, here used as a flash evaporator, is at a temperature of approximately 215° F. and has a moisture content of approximately 0.04% by weight. Cascade condenser discharge is cooled by heat exchange to approximately 165° F. Suspended solids are present in the effluent from the heat exchanger. The suspended solids are removed in a leaf filter using asbestos fiber as filter medium. The filtered rendered pork fat upon standing in storage or in sales containers congeals to a white solid.

To be salable as prime steam lard, this product must meet certain commercial specification. The specifications of commerce for prime steam lard are found in Table I. Data on product prepared by the above described process over a period of several months are set forth by way of minimum and maximum figures for each of the required properties of the product specification.

Table I

| Property | Commercial specification for prime steam lard | Commercial specification for refined lard | Product prepared |
| --- | --- | --- | --- |
| Free fatty acid percent max | 0.5 | 0.5 | 0.2-0.35 |
| Lovibond color max | [1] 3.0 | 1.5 | [1] 0.5-1.0 |
| Moisture max | 0.2 | 0.1 | 0.02-0.06 |
| Insoluble impurities | 0.10 | 0.05 | Tr.-0.02 |
| Peroxide value | 4.0 | 2.0 | 0.5-1.5 |

[1] Red.

In addition to the specification properties, the products of the present invention have a natural stability approaching that for prime steam lard containing small amounts of antioxidants. This high grade product is attained in better yield than can be obtained in the processing of refined lard. Recovery in the instant process, depending on types of raw fats rendered, averages between 76% and 83% as compared to 72% and 80% for conventional prime steam lard. Production of improved lard is accompanied by reduction in processing time and in cost. As a result of reducing processing time, the through put of the available rendering equipment may be increased a minimum of 25% and as much as 40%.

EXAMPLE II

Beef fat was comminuted to a particle size of approximately ⅜ inch pieces. This beef fat was subjected to processing in the equipment described in connection with Example I under conditions maintaining substantially the same temperature arrangement for each step of the process. Filtered flashed beef fat congealed to an edible tallow having the following properties:

| Property | Edible tallow |
| --- | --- |
| Color | 3.5 red. |
| Fatty acid | 0.35%. |
| Peroxide value | 2.0. |
| Stability | 10–15 hrs. |
| Moisture | 0.06%. |

The yield in the processing of beef fat is greater than in the conventional process for production of edible tallow. In addition, the color is such that the need to bleach the final product is eliminated. Further, the flavor and odor of the edible tallow of Example II may be blended without further processing with deodorized fats to prepare shortenings.

We claim:

1. In the manufacture of edible fats from packing house animal fat wherein the animal fat is rendered by direct contact with steam under pressure and the phase separation of the products of rendering is effected under pressure, the steps comprising withdrawing the separated hot liquid fat phase which contains up to about 1% of water while maintaining the pressure on the fat at substantially the pressure maintained during settling, reducing the pressure on the hot liquid fat to atmospheric pressure while maintaining evolved steam in contact with the partially cooled liquid fat to prevent contact with air, accumulating partially cooled liquid fat in a surge tank maintained under a sub-atmospheric pressure of less than 10 inches of water, moving the accumulated partially cooled liquid fat in an attenuated condition through a zone where a sub-atmospheric pressure of between about 24 inches and about 28 inches of mercury is maintained and the resultant flash vaporization of water present in the fat reduces the temperature of the fat to below 220° F. and the moisture content to less than 0.1%, cooling the flash liquid fat to a temperature of less than about 165° F. and filtering suspended solids from the cooled liquid fat.

2. In the manufacture of prime steam lard the steps comprising passing steam at a pressure between about 45 lbs. per square inch and 75 lbs. per square inch absolute though an accumulation of animal fat in a closed batch treatment zone to render said fat, holding the products of the steam treatment which attained a temperature in excess of 290° F. under substantially the pressure conditions of rendering and in a non-agitated condition until a liquid fat phase is separated, withdrawing the separated liquid pork fat phase which contains up to about 1% of water while maintaining the pressure on the fat at substantially the pressure maintained during settling, reducing the pressure on the hot liquid pork fat to atmospheric pressure, said hot pork fat at atmospheric pressure having a temperature between about 230° F. and 250° F. and maintaining steam in contact with the liquid pork fat to prevent contact with air, accumulating the partially cooled liquid fat in a surge tank maintained under a sub-atmospheric pressure of between about 2 and about 5 inches of water, moving the accumulated partially cooled liquid fat in the form of thin films through a zone where a subatmospheric pressure of between about 24 inches and 28 inches of mercury is maintained and the resultant flash vaporization of water present in the fat reduced the temperature of the fat to a temperature between 190° F. and about 220° F. and the moisture content of the fat to less than 0.07%, cooling the flashed liquid pork fat to a temperature less than about 165° F. and filtering suspended solids from the liquid fat.

3. In the manufacture of edible tallow the steps comprising passing steam at a pressure between about 45 lbs. per square inch and 75 lbs. per square inch absolute through an accumulation of animal fat in a closed batch treatment zone to render said fat, holding the products of the steam treatment which attained temperature in excess of 290° F. under substantially the pressure conditions of rendering and in a non-agitated condition until a liquid fat phase is separated, withdrawing the separated liquid beef fat phase which contains up to about 1% of water while maintaining the pressure on the fat at substantially the pressure maintained during settling, reducing the pressure on the hot liquid beef fat to atmospheric pressure, said hot beef fat at atmospheric pressure having a temperature between about 230° F. and 250° F. and maintaining steam in contact with the liquid beef fat to prevent contact with air, accumulating the partially cooled liquid fat in a surge tank maintained under a subatmospheric pressure of between about 2 and about 5 inches of water, moving the accumulated partially cooled liquid fat in the form of thin films through a zone where a sub-atmospheric pressure of between about 24 inches and 28 inches of mercury is maintained and the resultant flash vaporization of water reduced the temperature of the fat to a temperature between 190° F. and about 220° F. and the moisture content of the fat to less than 0.07%, cooling the flashed liquid beef fat to a temperature less than about 165° F. and filtering suspended solids from the liquid fat.

4. In the manufacture of edible fat from packing house animal fats wherein the animal fat is rendered by direct contact with steam under pressure and the products of rendering are separated by standing in a non-agitated condition, the steps comprising withdrawing the separated liquid fat phase which contains some unseparated water to a zone where the pressure maintained is in the range between approximately atmospheric pressure and about 10 inches of water subatmospheric pressure, maintaining an atmosphere of steam in contact with the hot fat to prevent contact with air, removing the hot liquid fat from said zone when at a temperature above about 230° F. and flowing the hot liquid fat into a treatment zone where a subatmospheric pressure in excess of about 24 inches of mercury is maintained, whereby, simultaneously, water present in the fat is vaporized, the hot fat cooled, and the moisture content of the cooled hot fat is reduced to less than 0.1% and removing suspended solids from the cooled liquid fat.

5. In the manufacture of edible fats from packing house animal fats wherein the animal fat is rendered by direct contact with steam under pressure and the products of rendering are separated by standing in a non-agitating condition, steps combined into a continuous operation comprising withdrawing the separated liquid fat phase which contains some unseparated water to a zone where the pressure maintained is in the range between approximately atmospheric pressure and about 10 inches of water subatmospheric pressure, removing the evolved vapors from said zone under conditions to maintain the pressure and to maintain an atmosphere of steam in contact with the hot fat to prevent contact with air, removing the hot liquid fat from said zone when at a temperature above about 230° F. and flowing the hot liquid fat into a treatment zone where a subatmospheric pressure in excess of about 24 inches of mercury is maintained, whereby, simultaneously, water present in the fat is vaporized, the hot fat cooled, and the moisture content of the cooled hot fat is reduced to less than 0.1% and removing suspended solids from the cooled liquid fat.

6. In the manufacture of prime steam lard wherein the pork fat is rendered by direct contact with steam under pressure and the products of rendering are separated by standing in a non-agitated condition, the steps comprising withdrawing the separated liquid pork fat phase which contains some unseparated water, to a zone where the pressure maintained is in the range between approximately atmospheric pressure and about 10 inches of water subatmospheric pressure, removing the evolved vapors under conditions to maintain the pressure and to permit holding an atmosphere of steam in contact with the hot fat to prevent contact with air, removing the hot liquid pork fat from said zone at a temperature above about 230° F. and flowing the hot liquid pork fat into a treatment zone where a subatmospheric pressure in excess of 24 inches of mercury is maintained, whereby, simultaneously, water present in the fat is vaporized, the hot fat cooled, and the moisture content of the cooled hot fat is reduced to less than 0.1%, and removing suspended solids from the cooled liquid pork fat.

References Cited in the file of this patent
UNITED STATES PATENTS

| 1,966,181 | Lowry | July 10, 1934 |
| 2,634,279 | Kuhrt | Aug. 7, 1953 |
| 2,742,488 | Dufault | Apr. 17, 1956 |

OTHER REFERENCES

Vibrans: "Journal of The American Oil Chemists' Society," vol. 26, pages 576 and 577, October 1949.

Bailey: "Industrial Oil and Fat Products," 1951, 2d Edition, pages 555 to 557.